(12) United States Patent
Ito

(10) Patent No.: US 9,920,791 B2
(45) Date of Patent: Mar. 20, 2018

(54) ROLLING BEARING WITH ROTATION SENSOR

(71) Applicant: NTN CORPORATION, Osaka (JP)

(72) Inventor: Hiroyoshi Ito, Mie (JP)

(73) Assignee: NTN CORPORATION, Osaka (JP)

( * ) Notice: Subject to any disclaimer, the term of this patent is extended or adjusted under 35 U.S.C. 154(b) by 0 days.

(21) Appl. No.: 15/034,291

(22) PCT Filed: Nov. 4, 2014

(86) PCT No.: PCT/JP2014/079191
§ 371 (c)(1),
(2) Date: May 4, 2016

(87) PCT Pub. No.: WO2015/072367
PCT Pub. Date: May 21, 2015

(65) Prior Publication Data
US 2016/0265595 A1 Sep. 15, 2016

(30) Foreign Application Priority Data

Nov. 14, 2013 (JP) .................................. 2013-235749

(51) Int. Cl.
*F16C 41/00* (2006.01)
*F16C 19/06* (2006.01)
(Continued)

(52) U.S. Cl.
CPC .............. *F16C 41/007* (2013.01); *C08K 3/00* (2013.01); *C08K 7/02* (2013.01); *F16C 19/06* (2013.01);
(Continued)

(58) Field of Classification Search
CPC .................................................... F16C 41/007
See application file for complete search history.

(56) References Cited

U.S. PATENT DOCUMENTS 7,249,891 B2 * 7/2007 Aoki ..................... F16C 33/586
384/448
8,356,940 B2 * 1/2013 Inoue .................. B60B 27/0005
384/448
(Continued)

FOREIGN PATENT DOCUMENTS

| CN | 1708692 | 12/2005 |
| CN | 101065588 | 10/2007 |

(Continued)

OTHER PUBLICATIONS

International Search Report dated Dec. 22, 2014 in corresponding International Application No. PCT/JP2014/079191 (with English translation).
(Continued)

*Primary Examiner* — Thomas R Hannon
(74) *Attorney, Agent, or Firm* — Wenderoth, Lind & Ponack, L.L.P.

(57) ABSTRACT

A rolling bearing with a rotation sensor includes an inner race and an outer race, one of which is a rotating race and the other of which is a stationary race. An annular magnetic encoder alternately magnetized in opposite polarities in its circumferential direction is mounted on the rotating race. A magnetic sensor configured to detect the changes in magnetic flux when the magnetic encoder is rotated is mounted in a resin sensor housing mounted on the stationary race. The sensor housing is made of a resin material including a resin composition containing polyphenylene sulfide, an inorganic filler, and glass fiber.

6 Claims, 3 Drawing Sheets

(51) Int. Cl.
    *F16C 19/52*     (2006.01)
    *G01P 1/02*     (2006.01)
    *C08K 3/00*     (2018.01)
    *C08K 7/02*     (2006.01)

(52) U.S. Cl.
    CPC .............. *F16C 19/52* (2013.01); *G01P 1/026* (2013.01); *F16C 2208/04* (2013.01); *F16C 2208/52* (2013.01)

(56) References Cited

U.S. PATENT DOCUMENTS

| | | | |
|---|---|---|---|
| 8,360,649 B2* | 1/2013 | Norimatsu | B60B 27/0005 384/448 |
| 9,234,908 B2* | 1/2016 | Shibata | G01D 5/145 |
| 2006/0039639 A1 | 2/2006 | Aoki et al. | |
| 2009/0154865 A1 | 6/2009 | Neubert et al. | |
| 2010/0052662 A1 | 3/2010 | Ito | |
| 2010/0061671 A1* | 3/2010 | Norimatsu | B60B 27/0005 384/448 |
| 2010/0273686 A1 | 10/2010 | Nakabayashi | |

FOREIGN PATENT DOCUMENTS

| | | |
|---|---|---|
| EP | 0 376 616 | 7/1990 |
| EP | 1 329 727 | 7/2003 |
| JP | 2003-301106 | 10/2003 |
| JP | 2008-111480 | 5/2008 |
| JP | 2008-202638 | 9/2008 |
| JP | 2009-133483 | 6/2009 |
| JP | 2013-44350 | 3/2013 |
| JP | 2013-177928 | 9/2013 |
| WO | 2008/026505 | 3/2008 |

OTHER PUBLICATIONS

Written Opinion of the International Searching Authority dated Dec. 22, 2014 in corresponding International Application No. PCT/JP2014/079191 (with English translation).

Extended European Search Report dated Nov. 7, 2016 in corresponding European Application No. 14862515.5.

Office Action dated Nov. 1, 2017 in Chinese Application No. 201480056196.4, with partial machine translation.

\* cited by examiner

ROLLING BEARING WITH ROTATION SENSOR

TECHNICAL FIELD

The present invention relates to a rolling bearing with a rotation sensor.

BACKGROUND ART

A rolling bearing with a rotation sensor is sometimes used as a bearing for supporting a rotary shaft in various types of rotary equipment, in order to detect its rotational speed (number of revolutions). This rolling bearing with a rotation sensor has an annular magnetic encoder alternately magnetized in opposite polarities in its circumferential direction and mounted on one of the inner and outer races which is rotatable. A magnetic sensor(s) configured to detect the changes in the magnetic flux when the magnetic encoder is rotated is mounted within a sensor housing mounted on the other one of the races, which is stationary, to detect the rotation of the rotating race. A circuit board for processing the output of the magnetic sensor is also often mounted in the sensor housing.

In many cases, such a sensor housing for a rolling bearing with a rotation sensor is made of a resin, and mounted on the stationary race through an outer ring made of a metal (see, JP 2008-111480).

JP 2008-111480 discloses a sensor housing which is made of a polymer alloy obtained by mixing polyphenylene sulfide (PPS) with polyamide (PA) and polyimide (PI). It is also disclosed therein that the use of this polymer alloy for forming the sensor housing is effective in reducing the creep of the sensor housing due to temperature change.

SUMMARY OF THE INVENTION

Problems to be Solved by the Invention

The sensor housing made of the material disclosed in JP 2008-111480 is effective in reducing the creep due to temperature change to a certain degree. However, a further improvement in creep resistance is required in terms of enhancing the accuracy of the sensor output and providing products having a higher precision.

Therefore, an object of the present invention is to provide a sensor housing in which the effect of reducing the creep due to temperature change is further improved.

SUMMARY OF THE INVENTION

In order to solve the above mentioned problems, the present invention has adopted the following constitution.

A rolling bearing with a rotation sensor comprising:
an inner race:
an outer race, wherein one of the inner race and the outer race is a rotating race and the other is a stationary race;
an annular magnetic encoder alternately magnetized in opposite polarities in its circumferential direction and mounted on the rotating race;
a magnetic sensor configured to detect the changes in magnetic flux when the magnetic encoder is rotated; and
a resin sensor housing in which is mounted the magnetic sensor therein and mounted on the stationary race;
wherein the sensor housing is formed of a resin material which is a resin composition containing polyphenylene sulfide, an inorganic filler, and a glass fiber.

As the inorganic filler, calcium carbonate may be used. The content of the calcium carbonate may be 20% by weight or more and 30% by weight or less, and the content of the glass fiber may be 20% by weight or more and 30% by weight or less, with respect to the total amount of the resin material.

Effect of the Invention

By using a material composed mainly of polyphenylene sulfide (PPS) and including calcium carbonate ($CaCO_3$) as the inorganic filler, as the material forming the sensor housing, it is possible to provide a sensor housing with an improved thermal stability and an extended creep resistance life.

Further, by being able to reduce the creep of the sensor housing due to temperature change, unexpected movements of the sensor housing due to vibration or temperature change during the rotation of the bearing can be reduced, allowing for the improvement in the accuracy of the sensor outputs, as well as the use of the sensor housing in a high-resolution sensor.

In addition, since polyamide (PA) and polyimide (PI) contained in materials conventionally used for sensor housings are not required, production efficiency in terms of raw materials can be improved.

Moreover, since the sensor housing of the present invention is made of a material including calcium carbonate, the amount of the resin composition used for the production of the sensor housing can be reduced, and the production efficiency in terms of raw materials can further be improved.

DETAILED DESCRIPTION OF THE INVENTION

An embodiment of the present invention will be described with reference to the drawings.

The rolling bearing with a rotation sensor according to the present invention includes: an inner race; an outer race, wherein one of the inner race and the outer race is a rotating race and the other is a stationary race; an annular magnetic encoder alternately magnetized in opposite polarities in the circumferential direction and mounted on the rotating race; a magnetic sensor configured to detect the changes in magnetic flux when the magnetic encoder is rotated; and a resin sensor housing in which is mounted the magnetic sensor and mounted on the stationary race.

The above described rolling bearing with a rotation sensor will be described with reference to the rolling bearing shown in FIGS. 1 to 3, as an example.

Figure 1:
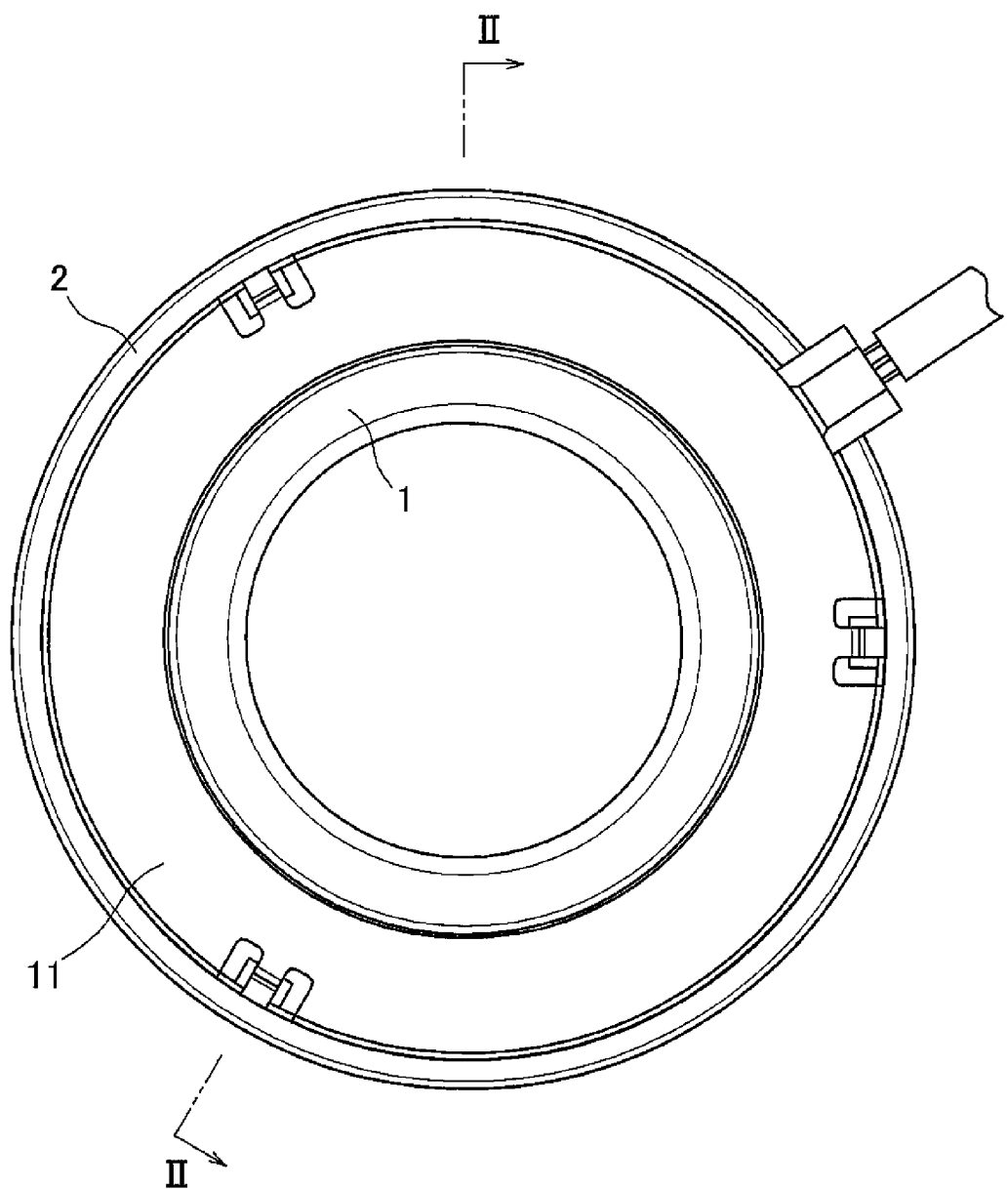
FIG. 1 is a front view of a rolling bearing with a rotation sensor embodying the present invention.
Figure 2:
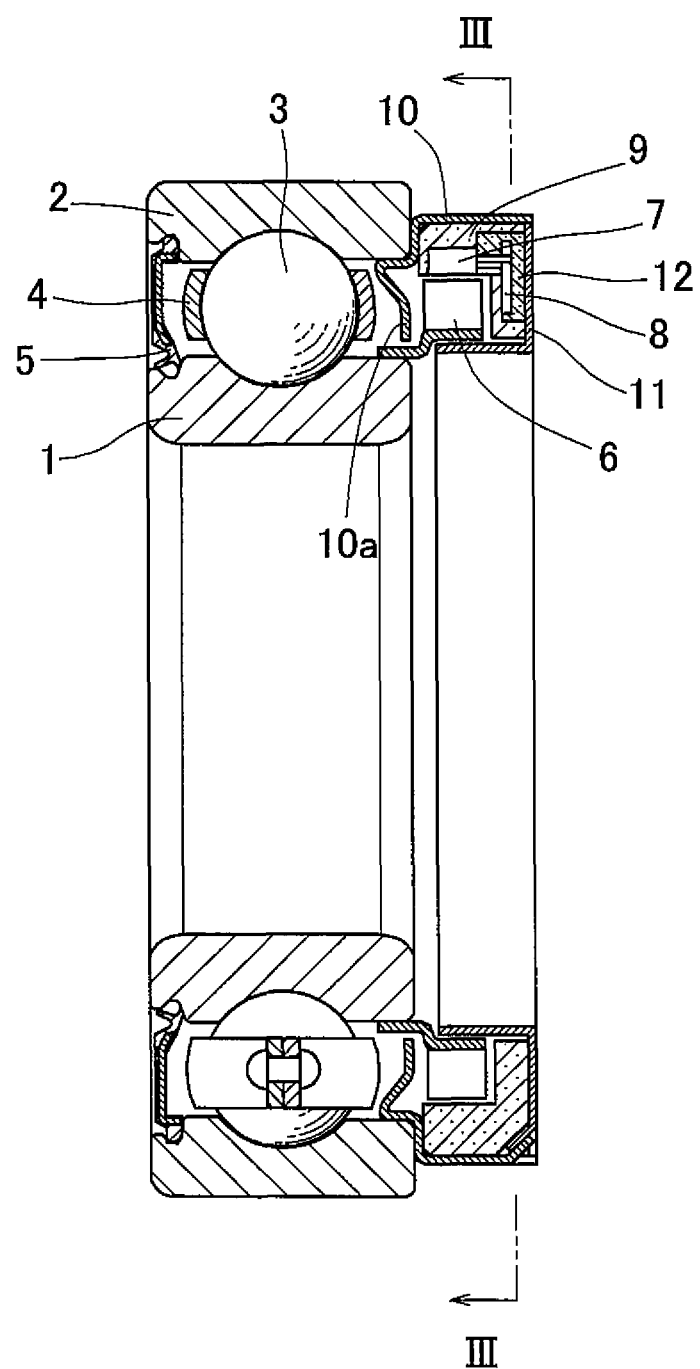
FIG. 2 is a cross sectional view taken along line II-II in FIG. 1.
Figure 3:
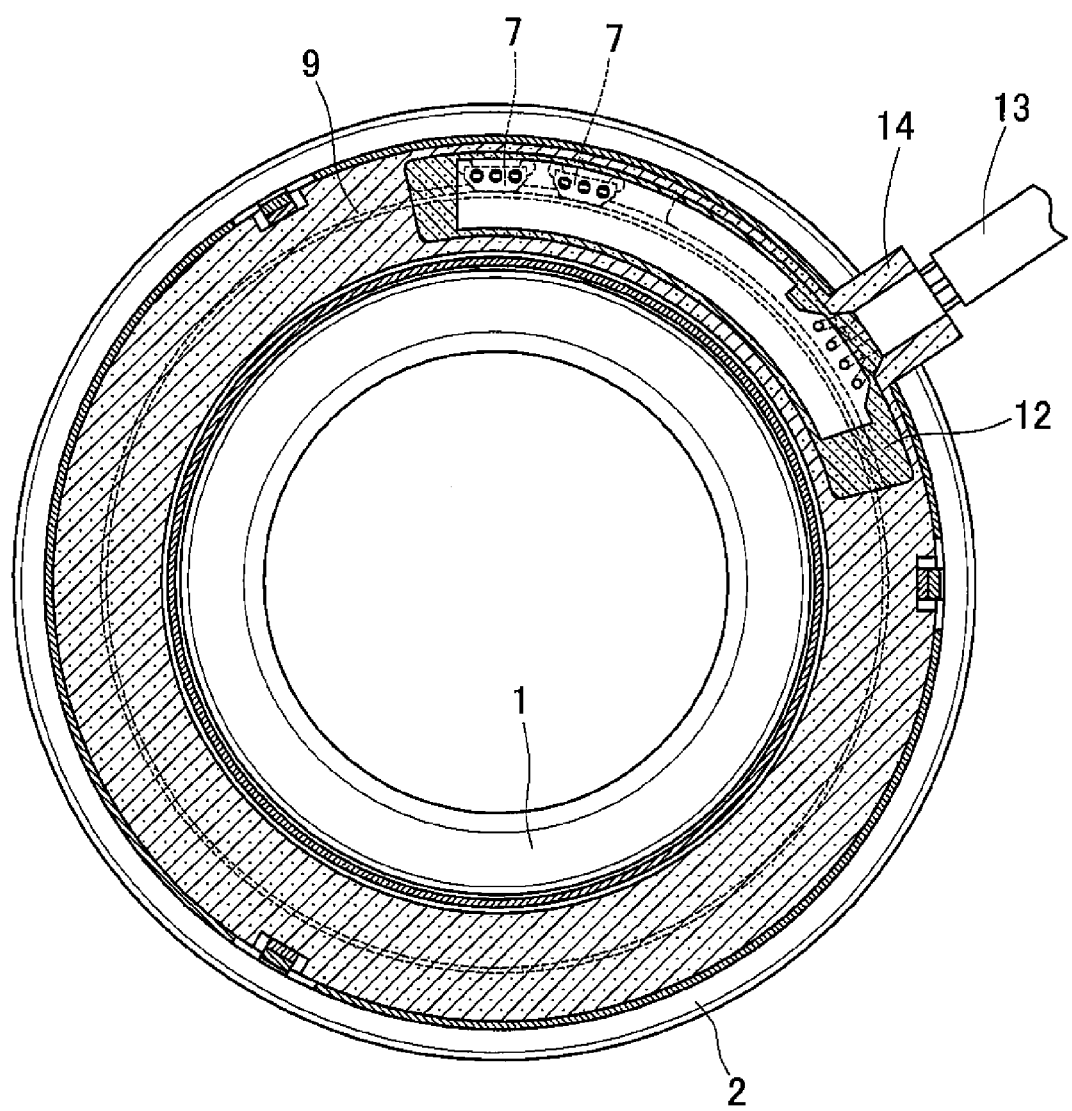
FIG. 3 is a cross sectional view taken along line III-III in FIG. 2.

The rolling bearing with a rotation sensor shown in FIGS. 1 to 3 is a deep groove ball bearing including: an inner race 1, which is a rotating race; an outer race 2, which is a stationary race; and balls 3 disposed between the inner race 1 and the outer race 2 and retained by a retainer 4. This rolling bearing includes a rotation sensor portion formed by: fixedly mounting a magnetic encoder 6 on the radially outer surface of the inner race 1; fixing an outer ring 10 on the radially inner surface of the outer race 2 facing the inner race 1; press-fitting a sensor housing 9 to the inner peripheral surface of the outer ring 10, mounting magnetic sensors 7, a circuit board 8, electrical wires and the like in the sensor housing 9; sealing the opening around the magnetic sensors 7 with a molded resin 12; and fixing a side plate 11 placed over the molded resin 12 by caulking with claws at three locations.

Further, a sealing member 5 for sealing the interior of the bearing is mounted on the side of the outer race 2 opposite from the sensor housing 9.

The molded resin 12 is a thermosetting resin. The thermosetting resin may be an epoxy resin or urethane resin. The magnetic encoder 6 is formed by press molding a thin metal plate into a ring, and bonding a magnetic rubber thereto by vulcanized adhesion, followed by magnetizing the ring in the radial direction such that north poles and south poles are alternately arranged in the circumferential direction.

Further, the two magnetic sensors 7 are disposed adjacently in the circumferential direction of the sensor housing 9 so as to face the magnetic encoder 6 in the radial direction.

As shown in FIG. 3, the two magnetic sensors 7 are disposed at two locations adjacent to each other in the circumferential direction of the sensor housing 9 so as to face the magnetic encoder 6 in the radial direction, and an output cable 13 connected to the magnetic sensors 7 extends outside the bearing through a tubular cable duct 14 formed integrally with the sensor housing 9. The magnetic sensors 7, the circuit board 8 and the output cable 13 mounted in the sensor housing 9 are fixed in position in the molded resin 12. The two magnetic sensors 7 are disposed adjacently in the circumferential direction so that the direction of rotation can be detected from the time delay between the detection outputs of these two magnetic sensors 7.

The sensor housing 9 is made of a resin material comprising a resin composition containing polyphenylene sulfide (PPS), an inorganic filler, and glass fiber. The sensor housing 9 is covered with the outer ring 10 and the side plate 11, which are formed by press molding a metal plate, such as a magnetic ferritic stainless steel plate, SUS430, and with the side plate 11, in order to shield the sensor housing 9 from harmful external magnetic field and to prevent corrosion. The outer ring 10 is fixedly fitted to the radially inner surface of the outer race 2, and a sealing portion 10a for sealing the interior of the bearing is formed at the inner end of the outer ring 10.

Inorganic fillers usable in the present invention include: carbonates such as calcium carbonate; hydroxides such as hydroxide calcium; sulfates such as barium sulfate; oxides such as silica and alumina; and silicates such as talc, mica and wollastonite.

The content of the inorganic filler contained in the resin composition forming the sensor housing 9 is preferably 20% by weight or more, and more preferably, 22% by weight or more. If the content of the inorganic filler is less than 20% by weight, the effect of reducing the creep of the sensor housing due to temperature change tends to be insufficient, and thus the effect of the present invention may not be sufficiently exhibited. The upper limit of the content of the inorganic filler, on the other hand, is preferably 30% by weight, and more preferably, 28% by weight. If the content is greater than 30% by weight, the effect of reducing the creep of the sensor housing due to temperature change tends to be insufficient, and thus the effect of the present invention may not be sufficiently exhibited.

The content of the glass fiber contained in the resin composition forming the sensor housing 9 is preferably 20% by weight or more, and more preferably, 22% by weight or more. If the content of the glass fiber is less than 20% by weight, the effect of reducing the creep of the sensor housing due to temperature change tends to be insufficient, and thus the effect of the present invention may not be sufficiently exhibited. The upper limit of the content the glass fiber, on the other hand, is preferably 30% by weight, and more preferably, 28% by weight. If the content is greater than 30% by weight, the effect of reducing the creep of the sensor housing due to temperature change tends to be insufficient, and thus the effect of the present invention may not be sufficiently exhibited.

The resin material forming the sensor housing 9 may include about several percent by weight of a rubber material, as necessary.

In the above mentioned embodiment, a deep groove ball bearing in which the inner race is designed as the rotating race is described. However, the rolling bearing with a rotation sensor according to the present invention may be a different type of rolling bearing, such as a roller bearing, or a rolling bearing in which the outer race is designed as the rotating race. In the latter case, the magnetic encoder of the rotation sensor is mounted on the outer race, and the sensor housing in which is mounted the magnetic sensor is mounted on the inner race.

EXAMPLES

The present invention will now be described specifically by way of Examples.

Example 1, Comparative Examples 1 and 2

The resin materials for forming the sensor housing with the compositions shown in Table 1 were used to form samples in the actual shape of the sensor housing. The thus obtained samples were subjected to thermal shock test, followed by measuring the shrinkage rates of the outer diameters of the samples.

The results of the thermal shock test are shown below.
[Thermal Shock Test]

One cycle consisting of the temperature change conditions as shown below was repeated 500 times.

−40° C.×60 min→room temperature×10 min→120° C.×60 min→room temperature×10 min

TABLE 1

|  |  | Example | Comparative Examples | |
|---|---|---|---|---|
|  |  | 1 | 1 | 2 |
| PPS | (% by weight) | 50 | 35 | 60 |
| PAI | (% by weight) | — | 25 | — |
| Calcium carbonate | (% by weight) | 25 | — | — |
| Glass fiber | (% by weight) | 25 | 40 | 40 |

(Results)

In Example 1, 20 samples were prepared and subjected to the thermal shock test. The results revealed that the shrinkage rates of the thicknesses of the samples were within the range of from 0% to −15%.

In Comparative Example 1, on the other hand, 10 samples were prepared and subjected to the thermal shock test. The results revealed that the shrinkage rates of the thicknesses of the samples varied in a broad range of from −25% to −130%.

In Comparative Example 2, 10 samples were prepared and subjected to the thermal shock test. The results revealed that the shrinkage rates of the thicknesses of the samples varied in a broad range of from −60% to −140%.

(Observation)

If the shrinkage rate of the sensor housing 9 due to thermal disturbance (thermal shock test) is high, it causes an increase in the gap between the outer ring 10 and the sensor housing 9, as compared to the case in which the shrinkage rate is low. In such a case, accordingly, there is a possibility that the sensor housing 9 moves unexpectedly within the outer ring 10 due to vibrations or the temperature change during the rotation of the bearing, which could cause an undesirable decrease in the accuracy of the rotation signal. Based on the above, Example 1 embodying the present invention, which has a low shrinkage ratio, is thought to be capable of exhibiting a sufficient creep resistance.

DESCRIPTION OF SYMBOLS 1 inner race
2 outer race
3 balls
4 retainer
5 sealing member
6 magnetic encoder
7 magnetic sensors
8 circuit board
9 sensor housing
10 outer ring
10a seal portion
11 side plate
12 molded resin
13 output cable
14 cable duct

The invention claimed is:

1. A rolling bearing with a rotation sensor comprising:
an inner race:
an outer race, wherein one of the inner race and the outer race is a rotating race and the other of the inner race and the outer race is a stationary race;
an annular magnetic encoder alternately magnetized in opposite polarities in a circumferential direction of the magnetic encoder and mounted on the rotating race;
a metal outer ring attached to the stationary race;
a magnetic sensor retained within the metal outer ring, the magnetic sensor being configured to detect changes in magnetic flux when the magnetic encoder is rotated, and being arranged to oppose the magnetic encoder in a radial direction of the rolling bearing; and
a resin sensor housing in which is mounted the magnetic sensor and mounted on the metal outer ring;
wherein the sensor housing is formed of a resin material which is a resin composition containing polyphenylene sulfide, an inorganic filler, and glass fiber.

2. The rolling bearing with a rotation sensor according to claim 1, wherein the inorganic filler is calcium carbonate.

3. The rolling bearing with a rotation sensor according to claim 2, wherein the resin material comprises 20% by weight or more and 30% by weight or less of the inorganic filler, and 20% by weight or more and 30% by weight or less of the glass fiber, with respect to the total amount of the resin material.

4. The rolling bearing with a rotation sensor according to claim 1, wherein the resin material comprises 20% by weight or more and 30% by weight or less of the inorganic filler, and 20% by weight or more and 30% by weight or less of the glass fiber, with respect to the total amount of the resin material.

5. A rolling bearing with a rotation sensor comprising:
an inner race:
an outer race, wherein one of the inner race and the outer race is a rotating race and the other of the inner race and the outer race is a stationary race;
an annular magnetic encoder alternately magnetized in opposite polarities in a circumferential direction of the magnetic encoder and mounted on the rotating race;
a magnetic sensor configured to detect changes in magnetic flux when the magnetic encoder is rotated, the magnetic sensor being arranged to oppose the magnetic encoder in a radial direction of the rolling bearing; and
a resin sensor housing in which is mounted the magnetic sensor and mounted on the stationary race;
wherein the sensor housing is formed of a resin material which is a resin composition containing polyphenylene sulfide, an inorganic filler, and glass fiber; and
wherein the resin material comprises 20% by weight or more and 30% by weight or less of the inorganic filler, and 20% by weight or more and 30% by weight or less of the glass fiber, with respect to the total amount of the resin material.

6. The rolling bearing with a rotation sensor according to claim 5, wherein the inorganic filler is calcium carbonate.

* * * * *